US005360787A

United States Patent [19]
Bloys et al.

[11] Patent Number: 5,360,787
[45] Date of Patent: Nov. 1, 1994

[54] DISPERSANT COMPOSITIONS COMPRISING SULFONATED ISOBUTYLENE MALEIC ANHYDRIDE COPOLYMER FOR SUBTERRANEAN WELL DRILLING AND COMPLETION

[75] Inventors: James B. Bloys; William N. Wilson, both of Plano; Edward Malachosky, Coppell; Roger D. Bradshaw, Allen, all of Tex.; Roger A. Grey, West Chester, Pa.

[73] Assignee: Atlantic Richfield Company, Los Angeles, Calif.

[21] Appl. No.: 827,475

[22] Filed: Jan. 28, 1992

Related U.S. Application Data

[63] Continuation of Ser. No. 523,630, May 15, 1990, abandoned.

[51] Int. Cl.$^5$ .......................... C09K 7/02; E21B 33/13
[52] U.S. Cl. .................................. 507/124; 252/8.551; 524/3; 526/287; 523/130
[58] Field of Search .......................... 252/8.551, 8.554; 106/725, 809; 507/134, 135, 124; 524/3; 526/287

[56] References Cited

U.S. PATENT DOCUMENTS

| | | | |
|---|---|---|---|
| 2,552,775 | 5/1951 | Fischer et al. | 252/8.51 |
| 2,650,905 | 9/1953 | Fordyce et al. | 252/8.51 |
| 2,718,497 | 9/1955 | Oldham et al. | 252/8.51 |
| 2,779,417 | 1/1957 | Clark et al. | 507/124 X |
| 2,979,454 | 4/1961 | Fields et al. | 252/8.51 |
| 3,234,154 | 2/1966 | Martin | 106/123.1 X |
| 3,409,080 | 11/1968 | Harrison | 166/293 |
| 3,421,584 | 1/1969 | Eilers et al. | 166/295 X |
| 3,730,900 | 5/1973 | Perricone et al. | 252/8.51 |
| 3,923,717 | 12/1975 | Lalk et al. | 106/90 X |
| 3,952,805 | 4/1976 | Persinski et al. | 166/293 |
| 4,036,660 | 7/1977 | Persinski et al. | 106/90 |
| 4,183,406 | 1/1980 | Lundberg et al. | 166/295 |
| 4,282,130 | 8/1981 | Lundberg et al. | 524/475 X |
| 4,302,341 | 11/1981 | Watson | 252/8.551 |
| 4,304,300 | 12/1981 | Watson | 252/8.551 X |
| 4,313,862 | 2/1982 | Lundberg et al. | 524/475 |
| 4,322,329 | 3/1982 | Lundberg et al. | 524/389 |
| 4,361,658 | 11/1982 | Lundberg et al. | 523/132 |
| 4,392,865 | 7/1983 | Grosse et al. | 252/312 X |
| 4,425,463 | 1/1984 | Walker et al. | 524/400 |
| 4,476,029 | 10/1984 | Sy et al. | 252/8.51 |
| 4,547,540 | 10/1985 | Yeoman | 524/130 |
| 4,552,939 | 11/1985 | Thaler et al. | 526/287 |
| 4,564,371 | 1/1986 | Ueda et al. | 252/355 X |
| 4,579,927 | 4/1986 | Patel et al. | 527/400 X |
| 4,581,147 | 4/1986 | Branch, III | 252/8.51 |
| 4,586,960 | 5/1986 | Iteuka et al. | 106/90 |
| 4,601,758 | 7/1986 | Nelson | 106/90 |
| 4,644,035 | 2/1987 | Dehm et al. | 525/344 |
| 4,646,834 | 3/1987 | Bannister | 166/291 |
| 4,680,128 | 7/1987 | Portnoy | 252/8.511 |
| 4,711,731 | 12/1987 | Garvey et al. | 252/8.514 |
| 4,715,971 | 12/1987 | Blair | 252/8.51 |
| 4,721,576 | 1/1988 | Hale et al. | 252/8.51 |
| 4,728,445 | 3/1988 | Hale | 252/8.514 |
| 4,734,204 | 3/1988 | Lamb | 525/384 X |
| 4,740,318 | 4/1988 | Hale et al. | 252/8.514 |
| 4,792,343 | 12/1988 | Hawe et al. | 252/321 X |
| 4,812,244 | 3/1989 | Lawson et al. | 252/8.514 |
| 4,814,389 | 3/1989 | Garvey et al. | 525/329.9 |
| 4,826,611 | 5/1989 | Blair | 252/8.51 |
| 4,883,125 | 11/1989 | Wilson et al. | . |
| 5,030,366 | 7/1991 | Wilson et al. | . |

FOREIGN PATENT DOCUMENTS 0207536 1/1987 European Pat. Off. .

OTHER PUBLICATIONS

"Subsurface Geology Petroleum Mining Construction" Edited by Leroy et al., Colorado School of Mines, 4th Ed, 1977. Dispersants for Coal Slurries CA 100:194933h.

Cement Dispersants Containing Polystyrenesulfonates and Olefin-Carboxylic Anhydride Copolymers CA 111:44433h.

Chesser, Bill G., "High-Temperature Stabilization of Drilling Fluids With a Low-Molecular-Weight Copolymer," *Journal of Petroleum Technology*, Jun. 1980, pp. 950–956.

*Primary Examiner*—Gary Geist

[57] ABSTRACT

A dispersant for drilling fluids, spacer fluids, cement slurries, completion fluids and mixtures of drilling fluids and cement slurries used for drilling and cementing subterranean wells.

5 Claims, No Drawings

DISPERSANT COMPOSITIONS COMPRISING SULFONATED ISOBUTYLENE MALEIC ANHYDRIDE COPOLYMER FOR SUBTERRANEAN WELL DRILLING AND COMPLETION

This is a continuation of copending application(s) Ser. No. 07/523,630 filed on May 15, 1990 now abandoned.

BACKGROUND OF THE INVENTION

1. Field of the Invention

The present invention pertains to compositions for use in the drilling and completion of subterranean wells. More specifically, the present invention relates to dispersants for drilling fluids, spacer fluids, cement slurries, completion fluids and mixtures of drilling fluids and cement slurries.

2. Description of the Prior Art

Techniques are well known for drilling and completing wells, particularly gas and oil wells, which are drilled from the surface of the earth to a subterranean formation containing a fluid mineral which it is desired to recover. After the fluid-containing geologic formation is located by investigation, a borehole is drilled through the overlying layers of the earth's crust to the fluid-containing geologic formation to permit recovery of the fluid mineral contained therein.

The drilling fluids used during drilling of the borehole are generally classified on the basis of their principal component. When the principal ingredient is a liquid (water or oil) the term "mud" is applied to a suspension of solids in the liquid. The most common drilling fluids contain water as the principal component. These drilling fluids are known as water-base drilling fluids or "water muds".

Water-base drilling fluids vary widely in composition and properties and many have been classified based on their principal ingredients. Some common classifications of water-base drilling fluids are freshwater muds, low solids muds, spud muds, salt water muds, lime muds, gyp muds and CL-CLS muds.

In addition to water, drilling fluids often include any number of known additives which perform various functions in the drilling fluid system. Among the most common additives are materials which increase density such as barite and galena and viscosifiers or thickening agents such as clays (usually bentonite).

Furthermore, many water-base drilling fluids are formulated to contain one or more polymeric additives which serve to disperse the drilling fluid, reduce the rate of filtrate loss, stabilize clays, flocculate drilled solids, increase carrying capacity, emulsify, lubricate and the like. Among the most commonly employed polymeric additives are starches, guar gum, xanthan gum, sodium carboxy-methylcellulose (CMC), hydroxyethylcellulose (HEC), carboxy methyl hydroxyethylcellulose (CMHEC) and synthetic water dispersible polymers such as acrylics and alkylene-oxide polymers.

Also well known and important for their ability to reduce flow resistance and gel development in clay-water muds are materials which are broadly referred to in the drilling fluid industry as "dispersants". Materials conventionally used as dispersants are classified as plant tannins, polyphosphates, lignitic materials, synthetic water dispersible polymers and lignosulfonates.

When the drilling of the borehole is completed, a casing is secured in position within the borehole to insure permanence of the borehole and to prevent entry into the well of a fluid from a formation other than the formation which is being tapped. The well casing is typically cemented in place by pumping a cement slurry downwardly through the casing. The cement slurry flows out of the open lower end of the casing at the well bottom and then upwardly around the casing in the annular space between the outer wall of the casing and the wall of the well borehole. Frequently, a spacer fluid is pumped downwardly through the casing ahead of the cement slurry to form a buffer between and prevent the contact of the drilling fluid and the cement slurry which are typically incompatible fluids.

The drilling process which produces the borehole will usually leave behind on the wall of the borehole produced, a drilling fluid filter cake of mud-like material. This material is a barrier to the formation of proper bonding by any cement composition employed to produce an impermeable bond between the casing and the well wall.

In an ideal cementing operation the drilling fluid filter cake would be removed from the well bore wall and replaced by the cement slurry to permit the formation of a solid layer of hardened, cured and bonded cement between the casing and the geologic formations through which the well borehole passes. It has been recognized in the art that removal of the drilling fluid filter cake is greatly enhanced by injecting the cement slurry, spacer fluids or the like into the well borehole under turbulent flow conditions.

Inducing turbulence by control of flow velocity alone requires a specific minimum velocity, which in turn is limited by the maximum pressure the wellbore can tolerate. Particularly, where the turbulence induced is sufficient to assure removal of the drilling fluid filter cake, additional pumping capacity and very high pressure levels are usually required. These required pressure levels, especially for deep wells, often exceed the pressure at which the subterranean formations break down, resulting in lost circulation. In addition, the required pressure level may exceed the capacity of the pumping equipment or the endurance of the well drilling and associated apparatus.

The pumping of cement slurries in turbulent flow at lower flow velocities than would be possible using conventional cement slurry compositions, has been accomplished in the prior art by adding to the said cement slurries a flow-property-improving and turbulence-inducing agent, which agent is also known as a dispersant.

After the drilling of the borehole is completed and the casing is cemented in position within the borehole, the casing is perforated to permit recovery of a fluid mineral. Frequently, a completion fluid is disposed within the borehole to maintain a hydrostatic head during the perforation process. Some common completion fluids are clear brines and bland drilling fluids.

In the cementing of oil and gas wells, rather than displacing and removing the drilling fluid during cement slurry placement, it has been proposed to convert the drilling fluid to a cementitious slurry for cementing casing or tubing in place or otherwise stabilizing or protecting the casing by sealing the formation in the vicinity of the borehole.

The conversion of drilling fluid or "mud" to a cement slurry, however, is not without some operational problems and undesirable compositional changes. For example, the addition of cementitious materials such as mixtures of lime, silica and alumina, or lime and magnesia, silica and alumina and iron oxide, or cement materials such as calcium sulphate and Portland cements to aqueous drilling fluids can substantially increase the viscosity of the fluid mixture and result in severe flocculation. Efforts to circulate such mixtures through a wellbore can result in a highly unsatisfactory circulation rate, plugging of the wellbore annulus, breakdown of the earth formation in the vicinity of the wellbore and a failure of the cement slurry to properly mix.

These, problems can be overcome by the addition of a dispersant composition which disperses both the drilling fluid and the cement slurry and allows mixtures of drilling fluids and cement slurries to be pumpable. However, conventional drilling fluid dispersants do not necessarily disperse cement slurries and conventional cement slurry dispersants do not necessarily disperse drilling fluids. In addition, conventional dispersants which do disperse both drilling fluids and cement slurries do not necessarily disperse mixtures of drilling fluids and cement slurries.

U.S. Pat. No. 3,730,900 discloses that sulfonated styrene maleic anhydride copolymer (SSMA) provides colloidal stabilization in aqueous drilling fluids. U.S. Pat. Nos. 3,952,805 and 4,036,660 disclose that SSMA acts as a flow-property improving and turbulence-inducing additive in cement slurries. U.S. Pat. Nos. 4,883,125, discloses that SSMA acts as a dispersant for mixtures of drilling fluids and cement slurries in a mud-to-cement conversion process.

U.S. Pat. No. 2,650,905 discloses that sulfonated polystyrene and copolymers of sulfonated styrene with maleic acid, fumaric acid, acrylic acid and methacrylic acid and their alkali metal and ammonium salts provide fluid-loss control in drilling fluids. U.S. Pat. No. 2,718,497 discloses that polyacrylic acid, acrylic acid-fumaric acid copolymer, polymethacrylic acid, acrylic acid-isobutylene copolymer, isobutylene-maleic anhydride and isobutylene-maleic acid copolymer and their alkali and ammonium salts provide fluid-loss control in drilling fluids.

U.S. Pat. Nos. 3,234,154 and 3,409,080 disclose that sulfonated polystyrene and polyvinyl alcohol provide fluid-loss control in and reduce the setting time of cement slurries.

Dispersant compositions typically exhibit varying properties and performance under different conditions. The performance of dispersant compositions may be evaluated in applications such as, drilling fluid dispersion, mud-to-cement dispersion, cement dispersion, low salt-low hardness mud dispersion, high salt-high hardness mud dispersion and at high temperature in all of the preceding applications.

The present invention has been developed with a view to providing improved dispersant compositions that control rheological properties of, enhance filtrate control in, and disperse one or more of drilling fluids, spacer fluids, cement slurries, completion fluids, and mixtures of drilling fluids and cement slurries.

SUMMARY OF THE INVENTION

The present invention provides compositions for dispersing one or more of drilling fluids, spacer fluids, cement slurries, completion fluids and mixtures of drilling fluids and cement slurries. The dispersant compositions control rheological properties of and enhance filtrate control in drilling fluids, spacer fluids, cement slurries, completion fluids and mixtures of drilling fluids and cement slurries.

According to the present invention the dispersants comprise homo- or copolymers derived from monomeric residues including low-molecular weight olefins which may be sulfonated or phosphonated, unsaturated dicarboxylic acids, ethylenically unsaturated anhydrides, unsaturated aliphatic monocarboxylic acids, vinyl alcohols and diols, and sulfonated or phosphonated styrene. The sulfonic acid, phosphonic acid and carboxylic acid groups on the polymers may be present in neutralized form as alkali metal or ammonium salts.

According to a preferred embodiment of the present invention, the dispersants comprise homo- or copolymers derived from monomeric residues including isobutylene, sulfonated isobutylene, phosphonated isobutylene, maleic anhydride, maleic acid, sulfonated styrene, phosphonated styrene, acrylic acid, methacrylic acid, fumaric acid, vinyl alcohol and vinyl ethylene glycol. The sulfonic acid, phosphonic acid and carboxylic acid groups on the polymers may be present in neutralized form as alkali metal or ammonium salts.

Those skilled in the art will further appreciate the above-described features of the present invention together with other superior aspects thereof upon reading the detailed description which follows.

DESCRIPTION OF PREFERRED EMBODIMENTS

The present invention relates to dispersants that control the rheological properties of, enhance filtrate control in, and disperse one or more of drilling fluids, spacer fluids, cement slurries, completion fluids and mixtures of drilling fluids and cement slurries.

According to the present invention, the molecular weight of the dispersants preferably is in the range of 1,000–15,000, and most preferably, is in the range of 2,000–10,000.

In addition, it is preferred that the dispersants have a high density of anionic charge, because the surface of the particles to be dispersed have some degree of positive charge. It is also preferred that the dispersants include anionic charge supplying functional groups such as sulfonic acid, phosphonic acid and carboxylic acid groups.

In drilling fluids and mixtures which include drilling fluids, it is preferred that the dispersants contain sulfonic acid or phosphonic acid groups when good salt tolerance is desired. It is also preferred that when good salt tolerance is desired, the dispersants include sulfonic acid or phosphonic acid groups in conjunction with polar nonionic groups, hydroxyl groups, aliphatic ester groups and alkylene oxide groups. In addition, the more salt tolerant dispersants tend to have fewer carboxylic acid groups which are more sensitive to divalent ions than are sulfonic acid or phosphonate groups.

In cement slurries and mixtures of drilling fluids and cement slurries, it is preferred that the dispersants contain a carboxylic acid group which has a high affinity for the calcium molecules contained in the cement slurry.

According to the present invention the dispersants comprise homo- or copolymers derived from monomeric residues including low-molecular weight olefins which may be sulfonated or phosphonated, ethylenically unsaturated dicarboxylic acids, ethylenically unsaturated anhydrides, unsaturated aliphatic monocarboxylic acids, vinyl alcohols and diols, and sulfonated or phosphonated styrene. The sulfonic acid, phosphonic acid and carboxylic acid groups on the polymers may be present in neutralized form as alkali metal or ammonium salts.

According to a preferred embodiment of the present invention, the dispersants comprise homo- or copolymers derived from monomeric residues including isobutylene, sulfonated isobutylene, phosphonated isobutylene, maleic anhydride, maleic acid, fumaric acid, sulfonated styrene, phosphonated styrene, acrylic acid, methacrylic acid, vinyl alcohol and vinyl ethylene glycol. The sulfonic acid, phosphonic acid and carboxylic acid groups on the polymers may be present in neutralized form as alkali metal or ammonium salts.

According to a most preferred embodiment of the present invention, the dispersant polymers include isobutylene-sulfonated isobutylene copolymer, isobutylene-phosphonated isobutylene copolymer, isobutylene-maleic anhydride copolymer, isobutylene-maleic acid copolymer, isobutylene-fumaric acid copolymer, isobutylene-sulfonated styrene copolymer, isobutylene-phosphonated styrene copolymer, isobutylene-acrylic acid copolymer, isobutylene-methacrylic acid copolymer, isobutylene-vinyl alcohol copolymer, isobutylene-vinyl ethylene glycol copolymer, polyisobutylene sulfonate, sulfonated isobutylene-phosphonated isobutylene copolymer, sulfonated isobutylene-maleic anhydride copolymer, sulfonated isobutylene-maleic acid copolymer, sulfonated isobutylene-fumaric acid copolymer, sulfonated isobutylene-sulfonated styrene copolymer, sulfonated isobutylene-phosphonated styrene copolymer, sulfonated isobutylene-acrylic acid copolymer, sulfonated isobutylene-methacrylic acid copolymer, sulfonated isobutylene-vinyl alcohol copolymer, sulfonated isobutylene-vinyl ethylene glycol copolymer, polyisobutylene phosphonate, phosphonated isobutylene-maleic anhydride copolymer, phosphonated isobutylene-maleic acid copolymer, phosphonated isobutylene-fumaric acid copolymer, phosphonated isobutylene-sulfonated styrene copolymer, phosphonated isobutylene-phosphonated styrene copolymer, phosphonated isobutylene-acrylic acid copolymer, phosphonated isobutylene-methacrylic acid copolymer, phosphonated isobutylene-vinyl alcohol copolymer, phosphonated isobutylene-vinyl ethylene glycol copolymer, polymaleic anhydride, maleic anhydride-maleic acid copolymer, maleic anhydride-fumaric acid copolymer, maleic anhydride-sulfonated styrene copolymer, maleic anhydride-phosphonated styrene copolymer, maleic anhydride-acrylic acid copolymer, maleic anhydride-methacrylic acid copolymer, maleic anhydride-vinyl alcohol copolymer, maleic anhydride-vinyl ethylene glycol copolymer, polymaleic acid, maleic acid-fumaric acid copolymer, maleic acid-sulfonated styrene copolymer, maleic acid-phosphonated styrene copolymer, maleic acid-acrylic acid copolymer, maleic acid-methacrylic acid copolymer, maleic acid-vinyl alcohol copolymer, maleic acid-vinyl ethylene glycol copolymer, polyfumaric acid, fumaric acid-sulfonated styrene copolymer, fumaric acid-phosphonated styrene copolymer, fumaric acid-acrylic acid copolymer, fumaric acid-methacrylic acid copolymer, fumaric acid-vinyl alcohol copolymer, fumaric acid-vinyl ethylene glycol copolymer, sulfonated polystyrene, sulfonated styrene-phosphonated styrene copolymer, sulfonated styrene-acrylic acid copolymer, sulfonated styrene-methacrylic acid copolymer, sulfonated styrene-vinyl alcohol copolymer, sulfonated styrene-vinyl ethylene glycol, phosphonated polystyrene, phosphonated styrene-acrylic acid copolymer, phosphonated styrene-methacrylic acid copolymer, phosphonated styrene-vinyl alcohol copolymer, phosphonated styrene-vinyl ethylene glycol, polyacrylic acid, acrylic acid-methacrylic acid copolymer, acrylic acid-vinyl alcohol copolymer, acrylic acid-vinyl ethylene glycol copolymer, polymethacrylic acid, methacrylic acid-vinyl alcohol copolymer, methacrylic acid-vinyl ethylene glycol copolymer, polyvinyl alcohol, vinyl alcohol-vinyl ethylene glycol copolymer and polyvinyl ethylene glycol. The sulfonic acid, phosphonic acid and carboxylic acid groups on the polymers may be present in neutralized form as alkali metal or ammonium salts.

Those skilled in the art will recognize that the homo- and copolymers enumerated above are named in terms of their respective constituent monomers, each of which includes at least one unsaturated bond, rather than referring to the saturated form of the monomers which exist after the polymerization reaction has occurred. Throughout the specification, homo- and copolymers according to the present invention will be named in this manner.

U.S. Pat. No. 3,730,900 discloses that sulfonated styrene maleic anhydride copolymer (SSMA) provides colloidal stabilization in aqueous drilling fluids. U.S. Pat. Nos. 3,952,805 and 4,036,660 disclose that SSMA acts as a flow-property improving and turbulence-inducing additive in cement slurries. U.S. Pat. Nos. 4,883,125, discloses that SSMA acts as a dispersant for mixtures of drilling fluids and cement slurries in a mud-to-cement conversion process.

U.S. Pat. No. 2,650,905 discloses that sulfonated polystyrene and copolymers of sulfonated styrene with maleic acid, fumaric acid, acrylic acid and methacrylic acid and their alkali metal and ammonium salts provide fluid-loss control in drilling fluids. U.S. Pat. No. 2,718,497 discloses that polyacrylic acid, acrylic acid-fumaric acid copolymer, polymethacrylic acid, acrylic acid-isobutylene copolymer, isobutylene-maleic anhydride and isobutylene-maleic acid copolymer and their alkali and ammonium salts provide fluid-loss control in drilling fluids.

U.S. Pat. Nos. 3,234,154 and 3,409,080 disclose that sulfonated polystyrene and polyvinyl alcohol provide fluid-loss control in and reduce the setting time of cement slurries.

The copolymers of the present invention may include any ratio of monomeric residues and preferably include monomeric residues in a ratio ranging from 1:10 to 10:1.

The water-solubility of the dispersants according to the present invention is influenced by both the molecular weight of the polymer and the presence of sulfonic acid and phosphonic acid groups on the polymer. As the molecular weight of the polymers increases their water-solubility decreases. As noted above, the polymers have a molecular weight, preferably, in the range of 1,000 to 15,000 and, most preferably, in the range of 2,000 to 10,000. The above molecular weight ranges are before sulfonation or phosphonation and, accordingly, do not include the weighting of these groups.

The sulfonic acid and phosphonic acid groups improve the water solubility of the polymers. When desired, the polymers of the present invention contain a sufficient number of sulfonic acid or phosphonic acid groups to render the polymer water soluble.

The homo- and copolymers of the present invention can be prepared by conventional polymerization techniques such as those described in Witcoff, Harold, ed. *Industrial Organic Chemicals in Perspective Part One: Raw Materials and Manufacture,* New York, N.Y., John Wiley & Sons, Inc., 1980, the disclosure of which is specifically incorporated herein by reference, which techniques will produce a polymer having the desired characteristics, and which techniques are well known to those of ordinary skill in the art. The isobutylene and methacrylic acid monomeric residues can be generated by processes well known in the art from tertiary butyl alcohol, which is a by-product of propylene oxide production. The polymers may be sulfonated as desired according to techniques well known to those of ordinary skill in the art such as those described in March, Jerry, ed. *Advanced Organic Chemistry,* 2nd Ed., McGraw-Hill, Inc., 1977, and in U.S. Pat. No. 4,797,450, the disclosures of which are specifically incorporated herein by reference.

The sulfonic acid, phosphonic acid and carboxylic acid groups on the polymers of the present invention, preferably are present in neutralized form as alkali metal or ammonium salts.

The dispersants, preferably, are added to drilling fluids, spacer fluids, cement slurries, completion fluids and mixtures of drilling fluids and cement slurries, as the case may be, at the rate of between 0.1 and 20.0 lbs. per 42-gallon barrel (ppb) of the original fluid and preferably between 1.0 and 10.0 ppb.

The rheological parameters indicated in the Examples which follow, including plastic viscosity (PV) indicated in centipoises and yield point (YP) indicated in pounds per hundred feet squared, were measured with a Model 35 Fann viscometer utilizing a #1 bob and sleeve and a #1 spring. A Fann viscometer uses a rotor and a bob which is attached to a spring, to measure the shear stress factor in a fluid. The bob and rotor are immersed in the fluid which is contained in a stationary test cup. The rotor, arranged in concentric alignment with the bob, causes the fluid to move at various shear rates, while the bob by means of the attached spring, measures the torque exerted on itself.

The dispersants of the present invention have utility in one or more of drilling fluids, spacer fluids, cement slurries, completion fluids and mixtures of drilling fluids and cement slurries and are substantially environmentally safer than the chrome lignosulfonates and chrome lignites currently in widespread use.

When added to drilling fluids, spacer fluids and completion fluids, the dispersants modify the rheological properties of the fluids and result in fluids having a plastic viscosity of from 3 to 70 centipoises, preferably, from 5 to 50 centipoises and a yield point of from 2 to 50 lbs/100 ft² preferably from 5 to 30 lbs/100 ft².

When added to cement slurries and mixtures of drilling fluids and cement slurries, the dispersants modify the rheological properties of the fluids and result in fluids having a plastic viscosity of from 10 to 400 centipoises, preferably, from 20 to 200 centipoises and a yield point of from 0 to 100 lbs/100 ft² preferably, from 5 to 50 lbs/100 ft².

EXAMPLE 1

Sulfonated isobutylene maleic anhydride (SIMA) was evaluated as a dispersant for drilling fluids. The drilling fluid used included 1.0 bbl of water, 17.5 pounds per barrel (ppb) of sodium montmorillonite, 35.0 ppb of calcium montmorillonite and 17.5 ppb of an altered calcium montmorillonite which is commercially available from Milwhite of Houston, Tex. under the trade designation Rev Dust. Table 1 below shows a comparison of the rheological properties of the drilling fluid alone at 120° F. and the rheological properties of the drilling fluid with the addition of 4.0 ppb SIMA at 120° F. The SIMA material had a molecular weight of 2500.

TABLE 1

| | Rheologies: | | | | | | | |
|---|---|---|---|---|---|---|---|---|
| | RPM | | | | | | | |
| | 600 | 300 | 200 | 100 | 6 | 3 | PV | YP |
| Drilling fluid | 120 | 104 | 103 | 101 | 95 | 95 | 16 | 88 |
| Drilling fluid + SIMA | 52 | 36 | 31 | 25 | 15 | 14 | 16 | 20 |

As shown clearly in Table 1, SIMA demonstrates good results as a dispersant for drilling fluids.

EXAMPLE 2

Tables 2 and 3 below show a dispersant performance comparison in mud/cement dispersions and cement slurries of SIMA having a molecular weight of 2500, sulfonated styrene maleic anhydride copolymer (SSMA) and condensed naphthalene sulfonate (a standard cement dispersant) available from Western Company under the trade designation Western TF-4.

TABLE 2

| MTC Slurry Components | Mud/Cement Dispersion @ Room Temperature | Mud/Cement Dispersion @ 180° F. |
|---|---|---|
| 350 cc mud<br>4.86 g. Western TF-4<br>300 g. "H" cement<br>105 cc water | Failed | — |
| 350 cc mud<br>3.5 g. SSMA<br>5 cc accelerator<br>300 g. "H" cement<br>140 cc water | PV = 55<br>YP = 31 | PV = 46<br>YP = 24 |
| 350 cc mud<br>5 g. SIMA<br>5 cc accelerator<br>300 g. "H" cement<br>105 cc water | PV = 68<br>YP = 32 | PV = 59<br>YP = 36 |

TABLE 3

| Cement Slurry Components | Cement Dispersion @ Room Temperature |
|---|---|
| 971 g. "H" Cement<br>296 g. H₂O<br>4.86 g. TF-4 | PV = 104<br>YP = 45 |
| 971 g. "H" Cement<br>296 g. H₂O<br>4.86 g. SSMA | PV = 110<br>YP = −18 |
| 971 g. "H" Cement<br>296 g. H₂O<br>4.86 g. SIMA | PV = 133<br>YP = −21 |

As shown in Tables 2 and 3, SIMA demonstrates dispersant performance characteristics in mud/cement dispersions and cement slurries that are quite favorable when compared to the similar performance of SSMA and Western TF-4.

EXAMPLE 3

Sodium polyacrylate (SPA) was evaluated as a dispersant for a mixture of drilling fluid and a cement slurry such as would be encountered in a mud to cement conversion process. The SPA used in this evaluation is commercially available from Hi-Tek Polymers, Inc. of Clifton, N.J. under the trade designation T-4484. The SPA material had a molecular weight of 2,200.

The dispersing ability of SPA was evaluated in a fresh water mud and a high hardness mud. A thick gelatinous base stock was prepared which included 70 ppb solids. The solids were made up of 25% sodium bentonite, 50% calcium bentonite and 25% Rev Dust. Table 4 below shows the rheological properties at 120° F. of a mixture of the base stock and SPA simulating a freshwater mud and a mixture of the base stock, SPA, and a sea salt simulating a salt water mud. The sea salt used is available from Aquarium Systems, Mentor, Ohio under the trade designation Instant Ocean.

TABLE 4

| | Rheologies: RPM | | | | | | | | |
|---|---|---|---|---|---|---|---|---|---|
| | 600 | 300 | 200 | 100 | 6 | 3 | GELS | PV | YP |
| 350 base stock + 0.15 cc SPA | 30 | 20 | 16 | 11 | 4 | 3 | 3/27 | 10 | 10 |
| 350 cc base stock + 15.0 cc SPA + 10 g. Instant Ocean* | 32 | 25 | 22 | 19 | 12 | 11 | 12/22 | 7 | 18 |

*The 10 g of Instant Ocean resulted in 1360 ppm of hardness (calcium and magnesium ions).

Table 4 demonstrates that SPA severely loses its efficiency in a high hardness environment such as a salt water mud. Specifically, the mixture of base stock and SPA included 0.15 cc of SPA and had a yield point of 10 lbs/100 ft$^2$. The mixture of base stock SPA and Instant Ocean included 15.00 cc of SPA and had a yield point of 18 lbs/100 ft$^2$. Thus despite a 100-fold increase in concentration of SPA, the mixture of base stock, SPA and Instant Ocean had a yield point that was almost twice that of the mixture of base stock and SPA.

The dispersing ability of SPA was also evaluated in a mixture of a drilling fluid and a cement slurry. The drilling fluid used included 1.0 barrel of water, 15.0 ppb of bentonite, 0.5 ppb of Drispac Regular (a polyanionic cellulose material available from Drilling Specialties Co., Bartlesville, Okla.), 1.0 ppb of Drispac Superlo (a polyanionic cellulose material available from Drilling Specialties Co., Bartlesville, Okla.; Drispac Regular has a higher molecular weight and viscosity in relation to Drispac Superlo), 0.5 ppb of Desco CF (a sulfomethylated tannin), 0.5 ppb of sodium hydroxide, and 111.3 ppb of Rev Dust. To 350 cc of the drilling fluid was added 200 g. of a cement to yield a mud-to-cement composition. To this mud-to-cement composition was added enough T-4484 to give 3 g. of SPA. The resultant composition had a plastic viscosity of 30 centipoises and a yield point of 13 lbs/100 ft$^2$.

Also, to the same volume of the mud-to-cement composition was added 3 g. of SSMA. The SSMA used is marketed by the National Starch and Chemical Corp. of Bridgewater, N.J. under the trade designation Narlex D72. This material had a molecular weight of 12,000 and a mole ratio of sulfonated styrene to maleic anhydride of about 1 to 1. The resultant composition had a plastic viscosity of 63 centipoises and a yield point of 53 lbs/100 ft.

This data demonstrates that despite the characteristic of polyacrylates to severely lose their efficiency in a high hardness environment, Hi-Tek's T-4484 sodium polyacrylate surprisingly yields excellent results in terms of plastic viscosity (PV) and yield point (YP) in comparison to SSMA in a mud-to-cement environment.

Although preferred embodiments of the present invention have been described in some detail herein, various substitutions and modifications may be made to the compositions of the invention without departing from the scope and spirit of the appended claims.

What is claimed is:

1. A drilling fluid comprising:
   a polymeric dispersant wherein said dispersant is sulfonated isobutylene maleic anhydride copolymer.

2. A spacer fluid comprising:
   a polymeric dispersant wherein said dispersant is sulfonated isobutylene maleic anhydride copolymer.

3. A mixture of a drilling fluid and a cement slurry comprising:
   a polymeric dispersant wherein said dispersant is sulfonated isobutylene maleic anhydride copolymer.

4. A cement slurry comprising:
   a polymeric dispersant wherein said dispersant is sulfonated isobutylene maleic anhydride copolymer.

5. A completion fluid comprising:
   a polymeric dispersant wherein said dispersant is sulfonated isobutylene maleic anhydride copolymer.

* * * * *